United States Patent
Ehrlich et al.

(10) Patent No.: US 8,777,247 B2
(45) Date of Patent: Jul. 15, 2014

(54) WHEEL SUSPENSION DEVICE FOR A MOTOR VEHICLE

(71) Applicant: GM Global Technology Operations LLC, Detroit, MI (US)

(72) Inventors: Dirk Ehrlich, Bodenheim (DE); Hartmut Hoelzel, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/653,586

(22) Filed: Oct. 17, 2012

(65) Prior Publication Data

US 2013/0099462 A1  Apr. 25, 2013

(30) Foreign Application Priority Data

Oct. 17, 2011 (DE) .......................... 10 2011 116 034

(51) Int. Cl.
*B60G 11/08* (2006.01)
*B60G 11/44* (2006.01)
*B60G 21/05* (2006.01)

(52) U.S. Cl.
USPC ...... 280/124.171; 280/124.106; 280/124.166; 280/124.175

(58) Field of Classification Search
CPC ........ B60G 11/04; B60G 11/08; B60G 11/44; B60G 21/05; B60G 21/55; B60G 2202/114
USPC .................... 280/124.106, 124.107, 124.116, 280/124.125, 124.128, 124.166, 124.171, 280/124.175
See application file for complete search history.

(56) References Cited

U.S. PATENT DOCUMENTS

| | | | | | |
|---|---|---|---|---|---|
| 292,036 | A | * | 1/1884 | Moyer | 280/124.12 |
| 334,032 | A | * | 1/1886 | Moyer | 280/124.171 |
| 450,704 | A | * | 4/1891 | Sample | 280/124.117 |
| 1,249,696 | A | * | 12/1917 | Waite | 280/124.113 |
| 1,323,839 | A | * | 12/1919 | Crabtree | 267/244 |
| 1,347,138 | A | * | 7/1920 | Wiberg | 267/243 |
| 2,039,983 | A | * | 5/1936 | Schlirf | 267/246 |
| 2,072,156 | A | * | 3/1937 | Cooke | 267/244 |

(Continued)

FOREIGN PATENT DOCUMENTS

| | | |
|---|---|---|
| DE | 400868 C | 8/1924 |
| DE | 1505340 A1 | 9/1969 |

(Continued)

OTHER PUBLICATIONS

German Patent Office, German Search Report for Application No. 102011116034.9, dated Aug. 6, 2012.

*Primary Examiner* — Paul N Dickson
*Assistant Examiner* — Laura Freedman
(74) *Attorney, Agent, or Firm* — Ingrassia Fisher & Lorenz, P.C.

(57) ABSTRACT

A wheel suspension device for a motor vehicle is provided. The wheel suspension device includes a wheel guiding device which is provided for connection to the motor vehicle and to a wheel. The wheel suspension device has a spring device, in one example, a leaf spring device, which at a first coupling point is connected to a coupling device in an articulated manner. The coupling device is connected to the wheel guiding device at a second coupling point in an articulated manner, and a coupling device axis is defined by a straight line through the first and through the second coupling point.

16 Claims, 4 Drawing Sheets

(56) References Cited

U.S. PATENT DOCUMENTS

| | | | |
|---|---|---|---|
| RE23,401 E * | 8/1951 | Vancoppenolle | 267/244 |
| 2,695,791 A * | 11/1954 | Heftler | 280/124.128 |
| 3,149,855 A * | 9/1964 | Adloff et al. | 280/124.145 |
| 3,257,123 A | 6/1966 | Giovinazzo | |
| 3,917,306 A | 11/1975 | Madler et al. | |
| 5,007,660 A * | 4/1991 | Orndorff et al. | 280/124.102 |
| 5,016,861 A * | 5/1991 | Thompson et al. | 267/44 |
| 5,251,930 A | 10/1993 | Kusaka et al. | |
| 5,547,207 A * | 8/1996 | Madler | 280/104 |
| 5,988,660 A | 11/1999 | Tattermusch | |
| 6,029,987 A | 2/2000 | Hoffman et al. | |
| 7,789,405 B2 * | 9/2010 | Lie | 280/124.116 |
| 8,505,939 B2 * | 8/2013 | Kim et al. | 280/124.128 |
| 2003/0030236 A1 | 2/2003 | Glass | |
| 2005/0173882 A1 * | 8/2005 | Drabon et al. | 280/124.107 |
| 2007/0057423 A1 | 3/2007 | Svendsen et al. | |
| 2010/0052281 A1 * | 3/2010 | Bitz et al. | 280/124.106 |
| 2011/0031712 A1 * | 2/2011 | Bitz et al. | 280/124.106 |
| 2012/0049482 A1 * | 3/2012 | Lizot et al. | 280/124.171 |
| 2012/0098229 A1 | 4/2012 | Hochapfel et al. | |
| 2012/0139205 A1 * | 6/2012 | Schroder et al. | 280/124.151 |

FOREIGN PATENT DOCUMENTS

| | | |
|---|---|---|
| DE | 102007051470 A1 | 4/2009 |
| DE | 102008049761 A1 * | 4/2010 |
| DE | 102009040763 A1 | 3/2011 |
| EP | 0098812 A2 | 1/1984 |
| EP | 0752934 B1 | 7/2000 |
| JP | 60045409 A | 3/1985 |
| JP | 07257131 A * | 10/1995 |
| JP | 2007153047 A * | 6/2007 |

* cited by examiner

WHEEL SUSPENSION DEVICE FOR A MOTOR VEHICLE

CROSS-REFERENCE TO RELATED APPLICATION

This application claims priority to German Patent Application No. 10 2011 116 034.9, filed Oct. 17, 2011, which is incorporated herein by reference in its entirety.

TECHNICAL FIELD

This application pertains to a device for the suspension of at least one front or rear wheel on a motor vehicle and to a motor vehicle in particular a passenger car having such a device.

BACKGROUND

For the suspension of wheels on motor vehicles, in particular on two-track motor vehicles, a number of different devices are known which guide a wheel of the motor vehicle in a predetermined manner during the spring movement. Such spring movements can materialize in particular when the motor vehicle is moved on an uneven road surface or because of acceleration processes, such as are typical for starting and braking processes as well as cornering.

During the spring movement, the camber of the wheel or its track is changed. Thus it has proved to be advantageous in certain driving situations, when during the spring movement of the wheel its track is changed. For example, it can be achieved in this way that the jouncing wheel adjusts itself in the direction of an increase of a toe-in. On the rear axle of a motor vehicle, this can lead to an understeering driving behavior, as is desirable for some motor vehicle types. For such an individual coordination of the kinematics of the wheel suspension device a complex design of the latter is necessary in most cases. Thus, double transverse link wheel suspension devices, for example, offer the possibility of an individual configuration of the spring movement of the wheel. Such designs however are complex as a rule and additionally require a lot of space. In modern motor vehicles, in particular passenger motor vehicles, other embodiments of wheel suspension devices are therefore frequently employed, which with partly limited adjustability of the spring movement can be produced more cost-effectively and require less installation space. The wheel suspension devices as a rule comprise a wheel guiding device and a spring device, while the spring device in most cases also includes a damping device. Frequently, coil spring devices or gas pressure spring devices, which counteract the suspension movement, are employed in the spring devices for generating a spring force. Furthermore, leaf spring devices can also be employed in the motor vehicle longitudinally or transversely to the travelling direction. For wheel guiding, devices are employed which can be divided in particular into the groups independent wheel suspension and rigid axle. In addition to this, twist-beam axles are known, wherein with such a twist-beam axle, two wheels mounted on the latter can carry out suspension movements as a rule largely independently of each other.

From the prior art, for example, from DE 10 2007 051 470 A1, the use of a transverse leaf spring in conjunction with a twist-beam axle is known. During the course of a jouncing movement, a length differential in longitudinal direction of the transverse leaf spring (motor vehicle transverse direction) relative to the wheel carrier occurs in this case. Such a length differential is offset through the use of a rubber bearing between the transverse leaf spring and the wheel carrier.

Accordingly, it is desirable to provide an improved wheel suspension device. In addition, other objects, desirable features and characteristics will become apparent from the subsequent summary and detailed description, and the appended claims, taken in conjunction with the accompanying drawings and this background.

SUMMARY

According to one of various aspects of the present disclosure, a wheel suspension device for a motor vehicle, in particular a passenger motor vehicle, comprises a wheel guiding device and a spring device. The wheel guiding device is provided or equipped for the connection to the motor vehicle and to a wheel. In one example, the wheel guiding device is provided for connection to a leaf spring device, which is connected as a first coupling point to a coupling device in an articulated manner, wherein the wheel guiding device is connected to the coupling device at a second coupling point in an articulated manner, and wherein the coupling device comprises a coupling device axis which is defined by a straight line through the first and the second coupling point.

In terms of the present disclosure, a wheel guiding device is to mean in one example a device which is provided in order to guide a wheel of a motor vehicle relative to the body. The guiding of the wheel in this case is to mean in one example, that the wheel during a suspension movement relative to a vehicle body moves on a predetermined path, generally substantially on a circular path about a guiding axis of rotation. Because of force effects and component elasticities, this path can change within a certain range. Generally, the guiding axis of rotation is arranged unchangeable in location relative to the motor vehicle structure. Minor local changes, which in particular result from elastic deformations of components, must also be understood to be at least substantially unchangeable in location. Generally, a wheel guiding device is to mean a rigid axle, for example, an individual wheel suspension or in one example, a twist-beam axle. Generally, a wheel guiding device comprises a wheel carrier which in one example extends in vehicle longitudinal direction. In one example, this wheel carrier is rotatably arranged about a pivot axis that is generally arranged substantially transversely to the vehicle longitudinal direction. Generally, a first wheel bearing is connected to a second wheel carrier by means of a cross member, wherein this cross member is in one example, designed rigidly and/or torsion-flexibly in order to make possible in this way generally a largely independent movement of the two wheel carriers and thus of two wheels.

In terms of the present disclosure, a spring device is to mean in one example a device for generating a spring force, which is provided in one example in order to be transmitted to the wheel guiding device. Generally, this spring force is provided in order to counteract a jouncing movement of the wheel. Here, jouncing movement is to mean in one example a movement of the wheel in the direction of the structure of the motor vehicle, thus as can occur in one example, when travelling over an obstacle that is raised relative to the remaining road surface. Generally, a spring device comprises a leaf spring device. Here, such a leaf spring device can comprise one or a plurality of for example, leaf-shaped spring elements. A leaf-shaped spring element is to generally mean a component which starting out from a cross-sectional area extends in a longitudinal direction that is at a right angle to said cross-sectional area. In one example, the extension in this longitudinal direction is greater than the extensions of the cross-sectional area, wherein the cross-sectional area is generally variable along this longitudinal extension. In one example, a leaf-shaped spring element comprises a cross-sectional area that is rectangular in shape at least in sections, alternatively a leaf-shaped spring element can also have other cross-sectional areas, such as, polygon-shaped or rounded. Generally, this leaf spring device is arranged transversely to the vehicle longitudinal direction, and in one example, substantially at a right angle to the vehicle longitudinal direction.

In terms of the present disclosure, the motor vehicle longitudinal axis is to mean in one example a straight line which, with the motor vehicle travelling straight ahead, extends in its forward travelling direction. Here, a direction to the vehicle front is described as forward, a direction to the vehicle rear is described as rear. Generally, the motor vehicle longitudinal axis substantially runs through the geometrical center of gravity of the motor vehicle contour. Generally, movements of the motor vehicle about the motor vehicle longitudinal axis are described as rolling movement.

In terms of the present disclosure, the motor vehicle vertical axis is to mean in one example, a straight line which is arranged perpendicularly to the motor vehicle longitudinal axis. Generally, the motor vehicle vertical axis with the non-jounced motor vehicle runs in direction of an imaginary plane (travelling plane) on which the motor vehicle moves. In one example, the motor vehicle vertical axis substantially runs through the motor vehicle center of gravity. Here, a direction towards the motor vehicle roof, starting out from the motor vehicle floor, is described as upwards. Generally, movements of the motor vehicle about the motor vehicle vertical axis are described as yawing movement.

In terms of the present disclosure, the motor vehicle transverse axis is to mean in one example, a straight line which is arranged perpendicularly to the motor vehicle longitudinal axis and perpendicularly to the motor vehicle vertical axis. Generally, the motor vehicle transverse axis substantially runs through the motor vehicle center of gravity. In one example, the motor vehicle transverse axis has, in particular with a two-track vehicle, a plurality of regions. Here, the region between the first and the second track is described as inside or within. Generally, movements of the motor vehicle about the vehicle transverse axis are described as pitching movement.

In terms of the present disclosure, a coupling device is to mean a device which is provided in order to couple the spring device and the wheel guiding device to each other in an articulated manner. Generally, the coupling device is designed as a bar or lever-like kinematic coupling. In one example, the coupling device is designed stiff, in particular rigid, torsionally flexible and/or rigid with respect to tension/compression. For example, the coupling device generally has a high rigidity which prevents the coupling device buckling or bending under the compressive loads that regularly occur in operation. Generally, a coupling device as a constituent part comprises one or a plurality of aluminum and/or steel materials, and/or one or a plurality of plastic materials, in one example at least one fiber-reinforced plastic. Generally, the coupling device is provided in order to transmit forces, in one example, compressive and tensile forces from the spring device to the wheel guiding device.

Generally, a first and a second coupling point lie in a common plane, in one example, in a plane that is perpendicular at least substantially to the vehicle longitudinal axis.

In terms of the present disclosure, a coupling device axis is to mean in one example, an imaginary straight line through a first and a second coupling point. Generally, only forces in the direction of this coupling device axis are substantially transmitted from the wheel guiding device to the spring device and vice versa.

In terms of the present disclosure, an outline plane is to mean in one example a plane which comprises a surface normal in the direction of the vehicle longitudinal direction. Generally, at least one of the two coupling points and/or any point of the wheel, in one example, the wheel center point, is an element of this outline plane.

In terms of the present disclosure, a structure guiding device is to mean in one example a device which guides the vehicle structure, for example, a frame construction, or a body device, relative to at least one wheel, for example, relative to a wheel guiding device while it carries out a suspension movement. Here, the guiding of the vehicle structure is to mean in one example, the movement of this structure on a predetermined path, generally approximately on a straight line in the direction of the vehicle vertical axis. Generally, a structure guiding device is embodied as a Panhard rod device or a Watt linkage device.

In terms of the present disclosure, a Panhard rod device is to mean in one example a device for guiding the body of the motor vehicle relative to at least one of the wheels during a suspension movement. In one example, a Panhard rod device comprises a rotationally moveable mounting on a first end, with which said device is connected to the body of the motor vehicle. Generally, this device comprises a second rotationally moveable mounting at an end located opposite the first end, with which it is connected to the wheel guiding device.

In terms of the present disclosure, a Watt linkage device is to mean in one example, a device for guiding the structure of the motor vehicle relative to at least one of the wheels during a suspensions movement. Generally, a Watt linkage device comprises a first and a second, substantially rod-shaped element. In one example, this device additionally comprises a lever device, wherein this lever device comprises a first and a second rod bearing point. Generally, the lever device is rotationally moveably coupled to the rod-shaped elements on these rod bearing points. In one example, this lever device comprises a lever pivot point, wherein this lever pivot point is generally arranged between the rod bearing points, generally on an imaginary straight line, in on example, arranged symmetrically between these. Generally, the lever device is rotationally moveably coupled to the wheel guiding device at its lever pivot point and the two ends of the bar-shaped elements, which are not coupled to the lever device, are rotationally moveably coupled to the structure of the motor vehicle. Alternatively, these ends of the bar-shaped elements can also be rotationally moveably coupled to the wheel guiding device and the lever pivot point is then rotationally moveably coupled to the wheel guiding device.

In terms of the present disclosure, the wheel contact area is to mean for example, that area that is formed when the wheel is pressed onto the travelling plane with a weight force, for example, a weight force of the motor vehicle. Generally, the wheel contact area is also described as tire contact area or sole area.

In terms of the present disclosure, an elastomer bearing device is to mean in one example, a device which permits the movability of two components relative to each other at least for a limited movement range, wherein for achieving this movability a bearing material is elastically deformed. Generally, elastomer bearing devices comprise components with different stiffness, while fastening components which are provided for fastening this device as a rule have a higher stiffness and movement components which are provided in order to make possible the movability have a lower stiffness.

In one example, a movement component comprises a material with higher intrinsic damping. Such materials are in one example elastomers, natural rubber, rubber or the like. A fastening component generally comprises steel, aluminum, ceramic, thermosetting plastics or the like. Generally, elastomer bearing devices are also described as rubber bearings. In one example, the connection components on an elastomer bearing device are configured so that the latter has no fastening components but can be directly arranged on at least one connection component or generally on both. Generally, such an elastomer bearing device is described as rubber buffer, rubber bushing or the like.

In one exemplary embodiment, the first coupling point is arranged in vehicle longitudinal direction in front of a wheel center point of the wheel. Generally, the spring device is arranged in front of this wheel center point. Through such an arrangement of the coupling point or of the spring device, a space-saving construction of the wheel suspension devices is made possible in particular in vehicle vertical direction. In one example, with the described exemplary embodiment, a structure guiding device, generally a Panhard rod device or a Watt linkage device can be arranged behind the wheel center point, in one example, in a vehicle transverse direction. Generally, the spring device needs to only have a small spring stroke in the described installation position.

In another exemplary embodiment, the first coupling point in vehicle longitudinal direction is arranged at the same height as the wheel center point or behind the latter. Generally, the use of a structure guiding device is also possible with this arrangement of the spring device. With the described arrangement of the spring device, spring stroke is increased and the forces generated by means of the spring device are reduced so that on the one hand a weaker component dimensioning is possible and on the other hand a sound coordination of the spring device is made possible.

In another exemplary embodiment, the wheel suspension device comprises a structure guiding device. Generally, such a structure guiding device is embodied as a Panhard rod device or as a Watt linkage device. Here, a Panhard rod device constitutes a type of the structure guiding device in a substantially simple manner. A Watt linkage device advantageously makes it possible to guide the vehicle structure approximately on a straight line, wherein this straight line generally runs in the direction of the vehicle vertical axis.

In one exemplary embodiment, the structure guiding device is arranged in vehicle longitudinal direction in front of or behind the spring device. If the structure guiding device is arranged behind the spring device, in one example, the path on which this device guides the vehicle structure, is extended. As a rule, with such a path extension, the active forces diminish and weaker-dimensioned, generally more space-saving components can be employed for the structure guiding device. If the structure guiding device is arranged in front of the spring device, in one example, the path on which this device guides the vehicle structure, is shortened. Such a shortening of the path advantageously results in a reduced movability and thus generally makes it possible to use a simplified component mounting. Additionally or alternatively, the lifespan of these little-moved components is increased.

In another exemplary embodiment, the coupling device is arranged so that an imaginary straight line, which on the one hand runs parallel to the coupling device axis and on the other hand substantially through the center of gravity of the wheel contact area, is located outside the coupling device axis in vehicle transverse direction. Generally, the coupling device is arranged so that the projection of this imaginary straight line in vehicle transverse direction also runs outside the projection of the coupling device axis in a common plane, for example, in the outline plane. Forces resulting from the wheel guidance, which act in the direction of the coupling device, for example, along this imaginary straight line, in one example, lead to a torque about the vehicle longitudinal axis acting on the wheel in particular because of the described spacing of the imaginary straight line and the coupling device axis. Generally, such a torque, in one example, during a jouncing movement, leads to a shifting of the wheel camber in negative direction. Here, as is usual in vehicle construction, negative direction of the wheel camber is to mean the inclination of the wheel in vehicle transverse direction towards the inside. Generally, the negative camber created through the described arrangement of the coupling device increases with rising wheel load. The wheel load rises in particular with increasing loading of the vehicle or because of the dynamic wheel load distribution, as typically occurs during cornering. Here, an enlargement of the camber in negative direction as a rule leads to an improvement of the lateral guiding forces and an improved wheel suspension device is thus provided.

In one exemplary embodiment, the coupling device is arranged so that an imaginary straight line, which on the one hand runs parallel to the coupling device axis and on the other hand substantially through the center of gravity of the wheel contact area, with which the coupling device axis coincides or from which it is only slightly spaced. Generally, the coupling device is arranged so that the projection of this imaginary straight line also coincides with the projection of the coupling device axis in a common plane, in one example, in the outline plane or is only slightly spaced from the latter. Here, a minor spacing is to mean generally a maximum of approximately half the extension of the wheel contact area in motor vehicle transverse direction. Forces resulting from the wheel guidance, which act in the direction of the coupling device, for example, along this imaginary straight line, result in practically no torque about the vehicle longitudinal axis acting on the wheel and thus to a minor influencing of the camber of the wheel since between the coupling device axis and this imaginary straight line substantially no or only a minor spacing materializes. Because of the described arrangement of the coupling device, camber changes due to changes of the wheel load, for example, such changes as originate from a change of the vehicle loading or because of dynamic effects, are offset or greatly reduced. Through the described manner of the arrangement of the coupling device it therefore becomes possible in an advantageous manner to establish the camber of the wheel by design and to keep it constant over wide ranges of the suspension movement of the wheel and thus to make available an improved wheel suspension device.

In one exemplary embodiment, the coupling device is arranged so that the coupling device axis encloses an acute angle $\alpha$ with the motor vehicle vertical axis. Generally, this acute angle $\alpha$ lies in a range between about 0° and about 90°. Generally, this angle $\alpha$ is greater than about 1°, in one example greater than about 3° and in one example, greater than about 5°. Additionally or alternatively, this angle $\alpha$ is generally smaller than about 60°, in one example smaller than about 45° and generally smaller than about 30°. Through the selection of the angle $\alpha$ from the described angle range, a favorable orientation of the coupling device relative to the wheel contact area and thus a favorable force transmission onto the latter, in particular the transmission of pressure forces and a space-saving construction of the wheel suspension device is made possible.

In one exemplary embodiment, the wheel guiding device is rotationally moveably coupled to the motor vehicle about a guiding axis of rotation. A guiding pivot point is to mean in one example a point which lies on this guiding axis of rotation and is generally arranged within the bodily extension of the wheel guiding device. In one example, the spring device or the second coupling point is arranged behind the guiding axis of rotation, generally behind the guiding pivot point. The guiding axis of rotation can generally run at an oblique angle to the vehicle longitudinal axis or in one example, at least substantially at a right angle or in another example, at a right angle to said vehicle longitudinal axis. Generally, the guiding axis of rotation and the coupling device axis can be projected into a common plane, wherein this common plane in one example, comprises the motor vehicle vertical axis as a surface normal. Generally, the coupling device axis or the second coupling point and the guiding axis of rotation or the guiding pivot point, or their projections, are spaced from one another in the common plane by a spacing a. Through the described arrangement of the wheel guiding device on the motor vehicle and in one example, through the described spacing a change of the track of the vehicle, an increase of the toe-in occurs during a jouncing movement of the wheel, such as typically occurs during a dynamic wheel load distribution because of a cornering of the motor vehicle. Here, toe-in, as is usual in vehicle construction, is to mean in one example that the distance of the wheel to the vehicle longitudinal axis in driving direction in front of the wheel center point is smaller than behind it. Advantageously, the effect of the dynamic increase of the wheel load on the curve-outer wheel with the described arrangement of the wheel suspension device results in that this wheel steers inwards towards the curve center point, which produces an advantageous understeer tendency of the motor vehicle.

In one exemplary embodiment, the coupling device is coupled at least on one of its coupling points, generally on both, to a pivot bearing device with the spring device or with the wheel guiding device. Here, a pivot bearing device in one example comprises a rolling bearing device and/or sliding bearing device. The pivot bearing device generally makes possible a durable, rotationally movable connection of components and thus in one example a connection of the coupling device to the spring device or to the wheel guiding device that is low in noise and drag torque.

In another exemplary embodiment, the coupling device is coupled at least on one of its coupling points, generally on both, with an elastomer bearing device to the spring device or to the wheel guiding device. Here, the use of at least one elastomer bearing device, in one example, when the latter has a material with high intrinsic damping, largely makes possible the vibration-related decoupling of the two through these connected components and thus a low-noise and comfortable design of the wheel suspension device.

In one exemplary embodiment, the spring device comprises one or a plurality of elastically deformable elements, in one example, leaf spring-like elements. Generally, an elastically deformable element comprises a steel material, in one example, a spring steel material as a constituent part thereof. Generally, an alloying element of such a material is silicon. In one example, an elastically deformable element comprises as a constituent part a plastic, generally a fiber-reinforced plastic. In this example, this plastic is reinforced with glass, carbon, steel, ceramic, basalt and/or other fibers. By using an individual elastically deformable element or by using a plurality of elastically deformable elements that are the same or coordinated with one another, the suspension behavior of the wheel suspension device can be coordinated in an advantageous manner. Plastics and fiber-reinforced plastics have a low weight and make possible weight savings. Steel materials can be favorably processed and make possible a cost-effective construction of a wheel suspension device.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
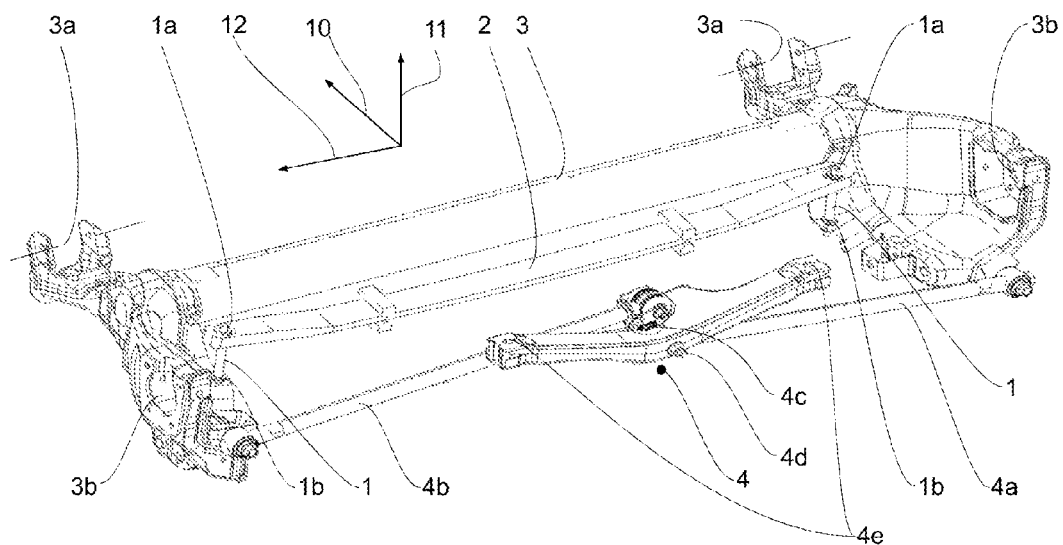
FIG. 1 is a wheel suspension device according to an exemplary embodiment of the present disclosure in the form of a twist-beam axle with watt linkage for the structure guidance.

In FIG. 1, a perspective representation of a wheel suspension device is shown, likewise the directions of the motor vehicle longitudinal axis 10, motor vehicle vertical axis 11 and motor vehicle transverse axis 12 are shown. Here, a transverse leaf spring device 2 is connected by means of a coupling device 1 to a wheel guiding device, in this case embodied as a twist-beam axle 3. The structure of the motor vehicle (not shown) is guided during the suspension movements relative to the twist-beam axle 3 by means of a Watt linkage device 4. The Watt linkage device 4 comprises a first and a second rod-shaped element 4a, 4b, these are articulated on the lever device 4c in an articulated manner and coupled to the twist-beam axle 3 likewise in an articulated manner. The lever device 4 is rotatably mounted about the lever pivot point 4d and with the fastening points 4e connected in a fixed location to the structure of the motor vehicle (not shown). The twist-beam axle 3 comprises two guiding axes of rotation 3a, the twist-beam axle 3 is rotatably articulated about these guiding axes of rotation 3a on the structure of the motor vehicle (not shown). The wheels (not shown), which are guided by means of the twist-beam axle 3, are rotatably mounted about the wheel bearing points 3b of the twist-beam axle 3. During a jouncing movement, e.g. when a wheel rolls over a raised irregularity on the road surface, forces are transmitted by the coupling device 1 from the wheel guiding device 3 onto the transverse leaf spring device 2. Upon this suspension movement, because of the mounting of the coupling device 1 in the transverse leaf spring device 2, first coupling point 1a, and in the wheel guiding device 3, second coupling point 1b, merely forces are transmitted via the transverse leaf spring device 2 in the direction of the coupling device 1. Through the coupling device 1, a non-force movement of the transverse leaf spring device 2 and of the wheel guiding device 3 is thus made possible.

Figure 2:
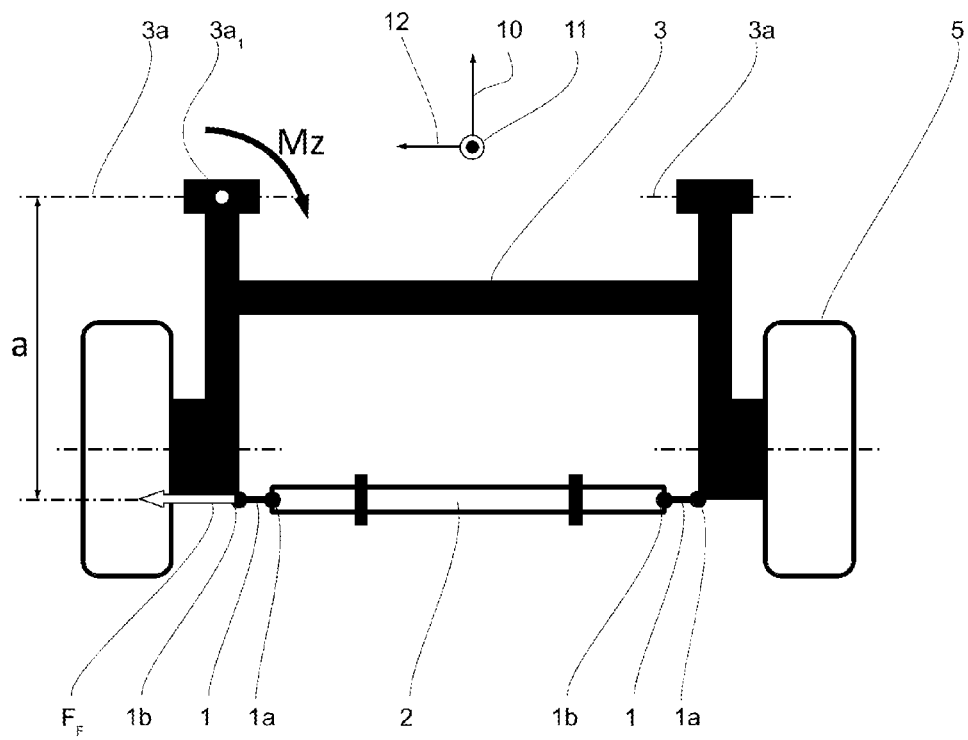
FIG. 2 is a wheel suspension device according to an exemplary embodiment of the present disclosure in a top view.

FIG. 2 shows a wheel suspension device in the top view, the direction of the motor vehicle longitudinal axis 10, motor vehicle vertical axis 11 and of the motor vehicle transverse axis 12 is likewise shown. Here, the coupling device 1 on its first and second coupling point 1a, 1b is connected to the transverse leaf spring device 2 or to the wheel guiding device 3. The wheel guiding device 3 is connected rotatably mounted about the guiding axis of rotation 3a to the structure of the motor vehicle (not shown). During a jouncing movement of the wheel 5, forces are transmitted through the articulated mounting of the coupling device 1 in the first and second coupling point 1a, 1b exclusively along an imaginary line, which runs through these two coupling points. The force FF in this case causes a torque Mz with the lever arm length a, this torque is oriented about the motor vehicle vertical axis 11. In addition, this torque Mz can cause a rotation of the wheel 5 about the guiding pivot point 3a1. Accordingly, such a torque Mz results in that the curve-outer wheel steers in towards the curve center point (not shown) in one example, when cornering. The consequence of this is that the toe-in of this wheel is increased. This increase of the toe-in leads to a desired understeer behavior of the motor vehicle.

Figure 3:
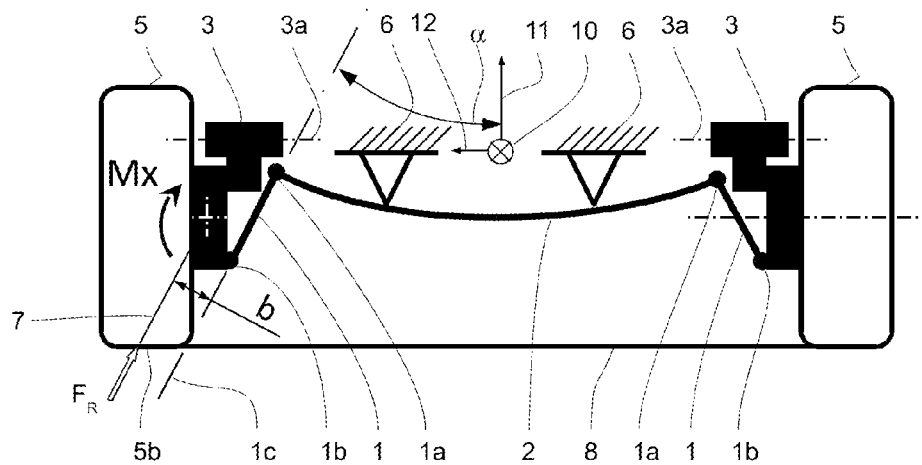
FIG. 3 is a wheel suspension device according to an exemplary embodiment of the present disclosure in a top-view plane.

FIG. 3 shows the wheel suspension device in the outline plane, and the direction of the motor vehicle longitudinal axis 10, motor vehicle vertical axis 11 and of the motor vehicle transverse axis 12 is likewise shown. Here, the coupling device 1 is coupled on its first and second coupling point 1a and 1b to the transverse leaf spring device 2 and the wheel guiding device 3 in an articulated manner. The transverse leaf spring device 2 is connected to the structure of the motor vehicle 6. The wheel guiding device 3 is connected to the structure of the motor vehicle 6 rotatably about the guiding axes of rotation 3a. The coupling device 1 in this case is arranged so that a coupling device axis 1c substantially runs in the direction of the vehicle transverse axis 12 on the inside, i.e. between the two wheels 5, passed a wheel contact area 5b. Here, the wheel contact area 5b lies in the travelling plane 8. A force FR transmitted by the wheel contact area 5b regularly acts along a parallel 7 to this coupling device axis 1c. This parallel 7 is spaced from the coupling device axis 1c by the spacing b. The force FR from the wheel contact area 5b and the spacing b thus cause a torque Mx on the wheel 5 and thus on the wheel guiding device 3. Here, the torque Mx, insofar as the wheel guiding device is deformed, leads to an increase of the wheel camber in the negative direction. In one example, the increase of the negative camber of the curve-outer wheel during cornering can lead to a desired driving behavior, generally to an increase of the transverse forces that can be transmitted by the wheel.

Figure 4:
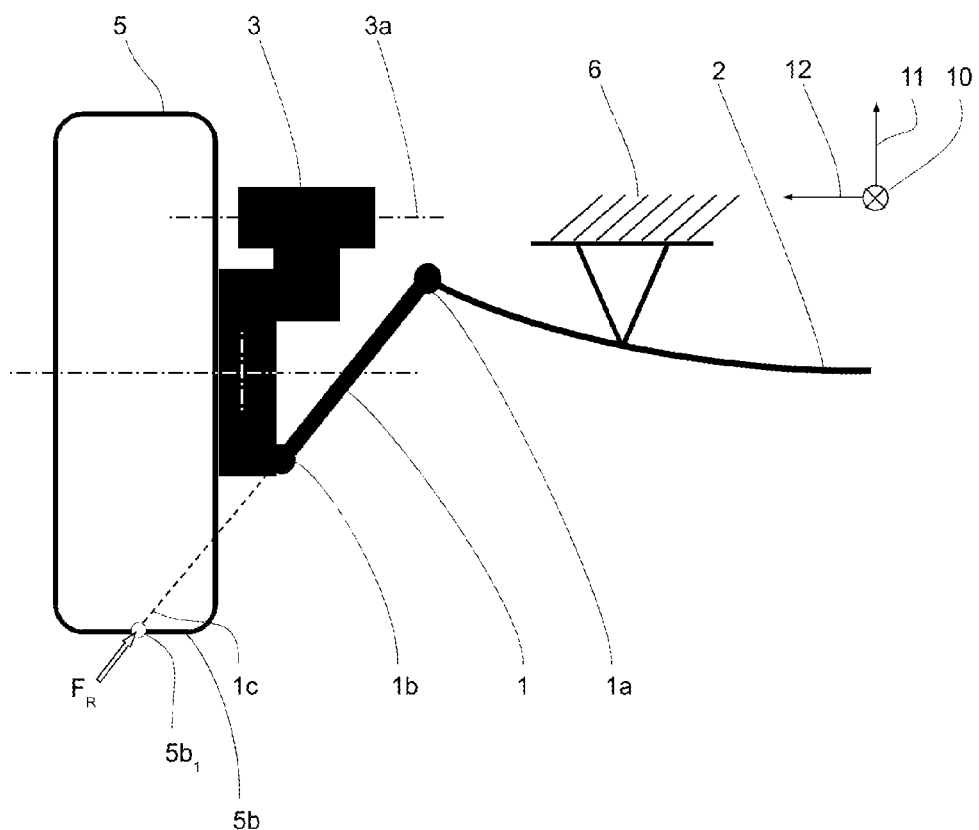
FIG. 4 is a detail view of the wheel suspension device of FIG. 3.

FIG. 4 shows a detail view of a wheel suspension device in the outline plane, and the direction of the motor vehicle longitudinal axis 10, motor vehicle vertical axis 11 and of the motor vehicle transverse axis 12 is likewise shown. Here, the wheel 5 is rotatably connected to the wheel guiding device 3 and the coupling device 1 at its coupling points 1a and 1b is coupled in an articulated manner to the transverse leaf spring device 2 and the wheel guiding device 3. The wheel guiding device 3 is rotatably connected to the structure of the motor vehicle about the guiding axis of rotation 3a. The coupling device 1 is arranged so that the projection of the coupling device axis 1c in the outline plane runs through the center of gravity 5b1 of the wheel contact area 5b of the wheel 5 was projected into this plane. Forces from the wheel contact area 5b accordingly do not result in any change of the inclination of the wheel 5, i.e. result in no camber change of this wheel.

Figure 5:
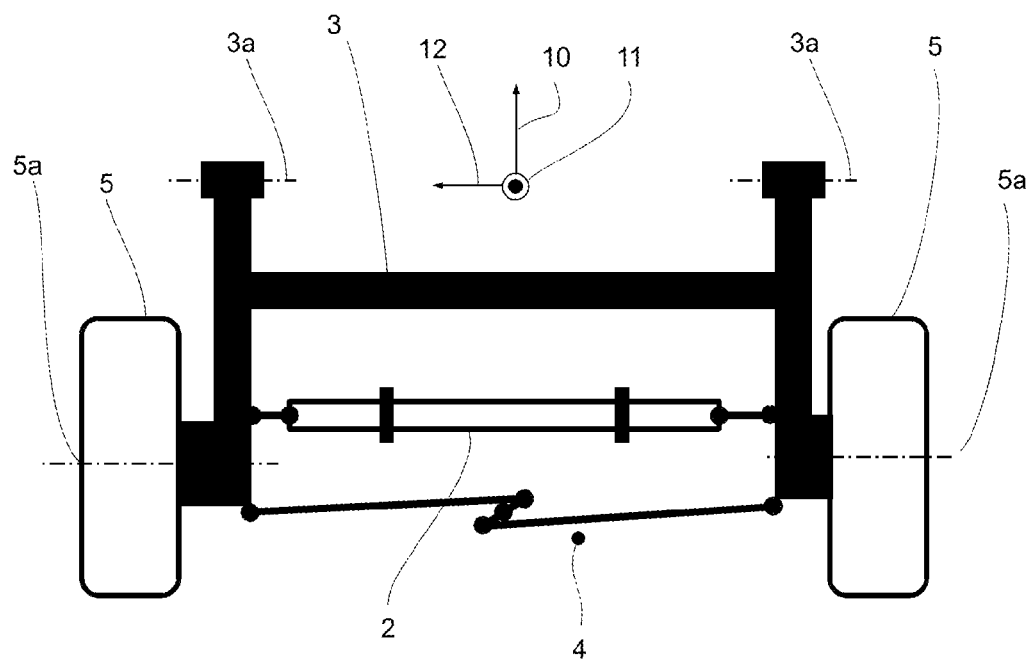
FIG. 5 is a wheel suspension device according to an exemplary embodiment of the present disclosure in a top view, wherein the Watt linkage device is turned by about 90° into this plane and the spring device is arranged in motor vehicle longitudinal direction before the wheel center point.

FIG. 5 shows a top view of a wheel suspension device, wherein here the wheel guiding device 3 is rotatably mounted about the guiding axis of rotation 3a on the structure of the vehicle (not shown). The direction of the motor vehicle longitudinal axis 10, motor vehicle vertical axis 11 and of the motor vehicle transverse axis 12 is likewise shown in this Figure. The wheels 5 are rotatably arranged about the wheel center points 5a on the wheel guiding device, in this case a twist-beam axle 3. Furthermore, the wheel suspension device comprises a Watt linkage device 4 for guiding the structure of the motor vehicle (not shown) relative to the wheel guiding device 3. The transverse leaf spring device 2 is arranged in direction of the motor vehicle longitudinal axis 10 in front of the wheel center point 5a. The Watt linkage device 4 is arranged in the direction of the vehicle longitudinal axis 10 behind the wheel center point 5a. Through the arrangement of the transverse leaf spring suspension arrangement 2 in front of the wheel center point 5a, the shown space-saving and compact construction of the wheel suspension device is obtained.

Figure 6:
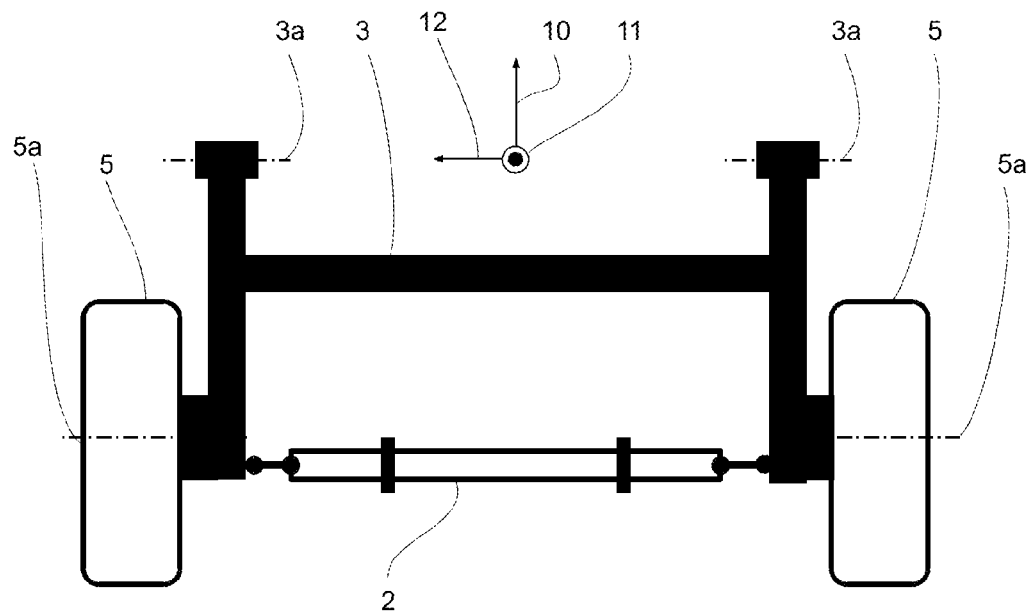
FIG. 6 is a wheel suspension device according to an exemplary embodiment of the present disclosure in a top view, wherein the spring device is arranged behind the wheel center point.

FIG. 6 shows a wheel suspension device in the same form of representation as in FIG. 5, wherein the transverse leaf spring device 2 is arranged seen in the direction of the motor vehicle longitudinal axis 10, behind the wheel center point 5a of the wheel 5. The motor vehicle vertical axis 11 and the motor vehicle transverse axis 12 are likewise shown in this Figure. Here, the wheel is rotatably arranged about the wheel center point 5a on the wheel guiding device, in this case a twist-beam axle 3. Through the arrangement of the transverse leaf spring device 2 behind the wheel center point 5a shown here, the spring stroke (see FIG. 8) increases, while as a rule lower suspension forces have to be employed with a longer spring stroke.

Figure 7:
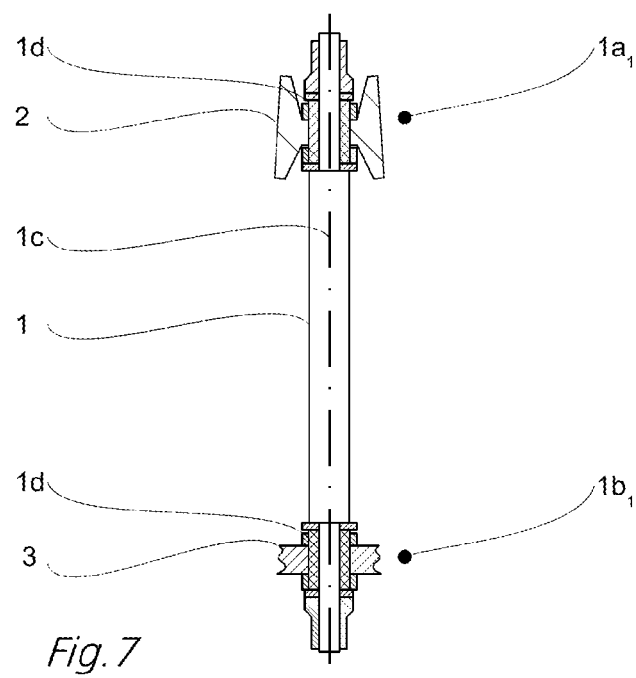
FIG. 7 is a coupling device and its connection to the wheel guiding device and the spring device according to an exemplary embodiment of the present disclosure.

FIG. 7 shows a sectional representation of the coupling device 1 with its articulated mounting relative to the spring device 2 and the wheel guiding device 3. Here, the coupling device 1 in each case is received in an articulated manner in an elastomer bearing device 1a1 and 1b1. The elastomer bearing devices 1a1, 1b1 each have an elastically deformable bearing material, in this case a rubber bushing 1d. Through elastic deformation of these rubber bushings 1d, a movability of the coupling device 1, on the one hand relative to the spring device 2 and on the other hand relative to the wheel guiding device 3 is made possible. Resetting forces such as can occur through the elastic deformation of the rubber bushings 1d, must not be considered as constrained forces. Through the articulated connection of the coupling device 1 to the wheel guiding device 3 and to the spring device 2, forces are only transmitted by said coupling device in the direction of the coupling device axis 1c. In one example, through this decoupling of the spring device 2 and the wheel guiding device 3 from each other also in vibration terms, a generally low-noise wheel suspension device that can be favorably coordinated is provided.

Figure 8:
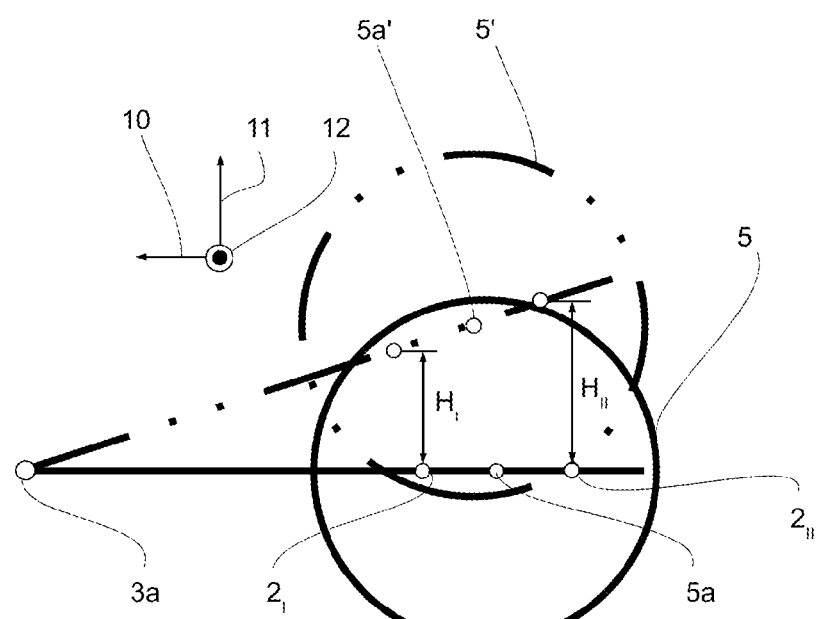
FIG. 8 is the spring stroke on a wheel suspension device according to an exemplary embodiment of the present disclosure.

FIG. 8 shows a lateral view of a wheel suspension device, the direction of the motor vehicle longitudinal axis 10, motor vehicle vertical axis 11 and of the motor vehicle transverse axis 12 is likewise shown. Here, this representation on the one hand shows the wheel suspension device in the non-jounced state (continuous line) and on the other hand in the jounced state (dash-two dotted line). Furthermore, the spring stroke HI and HII is drawn in, as it occurs when the spring device 2I is arranged in front of the wheel center 5a of the wheel 5 and how this occurs when the spring device 2II is arranged behind the wheel center 5a of the wheel 5. The spring stroke HI and HII in each case presents the difference between the non-jounced wheel 5a, 5e and the jounced wheel 5', 5a'. Here it is clearly evident that the spring stroke HII, when the spring device 2II is arranged behind the rear position, is greater than the spring stroke HI when the spring device 2I is arranged in the front position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A wheel suspension device for a motor vehicle, comprising:
    a wheel guiding device, which is provided for connection to the motor vehicle and to a wheel, wherein the wheel guiding device is a twist-beam axle;
    a coupling device having a first coupling point and a second coupling point, the coupling device connected to the wheel guiding device at the second coupling point in an articulated manner and a coupling device axis is defined by a straight line through the first coupling point and the second coupling point, wherein the coupling device axis intersects a travelling plane at a piercing point, and wherein the coupling device is arranged so that the piercing point of the coupling device axis through the travelling plane or a projection of the piercing point into an outline plane in vehicle transverse direction lies in a wheel contact area or lies in a projection of the wheel contact area into the outline plane, and wherein the first coupling point is arranged in a vehicle longitudinal direction in front of a wheel center point of the wheel; and
    a leaf spring device connected on the first coupling point of the coupling device in an articulated manner.

2. The wheel suspension device according to claim 1, further comprising a structure guiding device that guides a body of the motor vehicle relative to the wheel during a suspension movement.

3. The wheel suspension device according to claim 2, wherein the structure guiding device is a Panhard rod or Watt linkage device.

4. The wheel suspension device according to claim 2, wherein the structure guiding device in a vehicle longitudinal direction is arranged in front of or behind the leaf spring device.

5. The wheel suspension device according to claim 1, wherein the coupling device axis intersects a travelling plane at a piercing point, and wherein the coupling device is arranged so that in a rest condition of the wheel suspension device the piercing point of the coupling device axis through the travelling plane or the projection of this piercing point into the outline plane in vehicle transverse direction lies in the wheel contact area or in the projection of the wheel contact area into the outline plane.

6. The wheel suspension device according to claim 1, wherein the coupling device is arranged so that the piercing point of the coupling device axis through the travelling plane or the projection of this piercing point into the outline plane in a vehicle transverse direction at least substantially coincides with the projection of a center of gravity into the outline plane.

7. The wheel suspension device according to claim 1, wherein the coupling device is arranged in such a manner that the coupling device axis or a projection thereof into an outline plane encloses an angle with a motor vehicle vertical axis, and the angle ranges between about 0° and about 90°.

8. The wheel suspension device according to claim 7, wherein the angle is between about 5° and about 30°.

9. The wheel suspension device according to claim 1, wherein the wheel guiding device is provided on the motor vehicle for the rotationally movable connection about a guiding axis of rotation, in that the second coupling point is arranged in a vehicle longitudinal direction behind the guiding axis of rotation and the coupling device axis in the vehicle longitudinal direction is spaced from the guiding axis of rotation.

10. The wheel suspension device according to claim 1, further comprising at least one pivot bearing device for connection to the wheel guiding device or to the leaf spring device, which comprises at least one of a rolling bearing and a sliding bearing.

11. The wheel suspension device according to claim 1, further comprising at least one elastomer bearing device for connection to at least one of the wheel guiding device and the leaf spring device, wherein the at least one elastomer bearing device makes possible the relative movement of the coupling device to the leaf spring device or to the wheel guiding device by means of the elastic deformation of a bearing material.

12. The wheel suspension device according to claim 1, wherein the leaf spring device further comprises at least one elastically deformable element, wherein at least one of these elements comprises at least one of a steel material and a plastic.

13. The wheel suspension device according to claim 12, wherein the steel material is a spring steel material, and the plastic is a fiber-reinforced plastic.

14. A motor vehicle having a body, comprising:
    a wheel;
    a wheel suspension device connected to the motor vehicle and to the wheel, the wheel suspension device including:
        a wheel guiding device, which is provided for connection to the motor vehicle and to a wheel, wherein the wheel guiding device is a twist-beam axle;
        a coupling device having a first coupling point and a second coupling point, the coupling device connected to the wheel guiding device at the second coupling point in an articulated manner and a coupling device axis is defined by a straight line through the first coupling point and the second coupling point, wherein the coupling device axis intersects a travelling plane at a piercing point, and wherein the coupling device is arranged so that the piercing point of the coupling device axis through the travelling plane or a projection of the piercing point into an outline plane in vehicle transverse direction lies in a wheel contact area or lies in a projection of the wheel contact area into the outline plane, and wherein the first coupling point is arranged in a vehicle longitudinal direction in front of a wheel center point of the wheel;

a spring device connected on the first coupling point of the coupling device in an articulated manner; and a structure guiding device that guides the body of the motor vehicle relative to the wheel during a suspension movement.

15. The motor vehicle according to claim 14, wherein the structure guiding device in a vehicle longitudinal direction is arranged in front of or behind the spring device.

16. The motor vehicle according to claim 14, wherein the first coupling point is arranged in a vehicle longitudinal direction in front of a wheel center point of the wheel.

\* \* \* \* \*